United States Patent [19]

Deki

[11] Patent Number: 5,014,278
[45] Date of Patent: May 7, 1991

[54] METHOD FOR THE FREQUENCY STABILIZATION OF INTERNAL MIRROR TYPE HELIUM-NEON LASER OSCILLATING AT WAVELENGTH OF 543 NM

[75] Inventor: Kyoichi Deki, Kakogawa, Japan

[73] Assignee: Ushio Denki Kabushiki Kaisha, Tokyo, Japan

[21] Appl. No.: 406,060

[22] Filed: Sep. 12, 1989

[30] Foreign Application Priority Data

Sep. 22, 1988 [JP] Japan ................................. 63-236374
Sep. 22, 1988 [JP] Japan ................................. 63-236375
Sep. 22, 1988 [JP] Japan ................................. 63-236376
Sep. 22, 1988 [JP] Japan ................................. 63-236377

[51] Int. Cl.⁵ .............................................. H01S 3/13
[52] U.S. Cl. ...................................... 372/32; 372/37; 372/27; 372/38; 372/34
[58] Field of Search .................. 372/32, 37, 29, 38, 372/34, 27, 92

[56] References Cited

U.S. PATENT DOCUMENTS 3,976,957  8/1976  Le Floch et al. ................... 372/32
4,398,293  8/1983  Hall et al. ........................... 372/32
4,672,618  6/1987  Wijntjes et al. ..................... 372/32
4,779,279  10/1988  Brown ................................ 372/32

Primary Examiner—LACU /e/ on Scott, Jr.
Attorney, Agent, or Firm—Finnegan, Henderson, Farabow, Garrett & Dunner

[57] ABSTRACT

A method for the frequency stabilization of a laser oscillated from an internal mirror type helium-neon laser device and having an oscillation wavelength of 543 nm is disclosed, wherein a static magnetic field satisfying the following conditions (1)–(3):

(1) the direction of the static magnetic field is perpendicular to the axis of the capillary tube and the angle between the direction of the static magnetic field and the direction of a characteristic polarization of the laser tube is equal to 30°–42°;

(2) the magnitude of the static magnetic field is such that each Zeeman frequency in $\pi$ and $\pm\sigma$ transitions equals an axial mode spacing when the static magnetic field is applied into the laser capillary; and (3) the magnitude of the static magnetic field is almost even along the longitudinal direction of the laser capillary, is applied into a laser capillary so as to prevent polarization flipping.

8 Claims, 12 Drawing Sheets

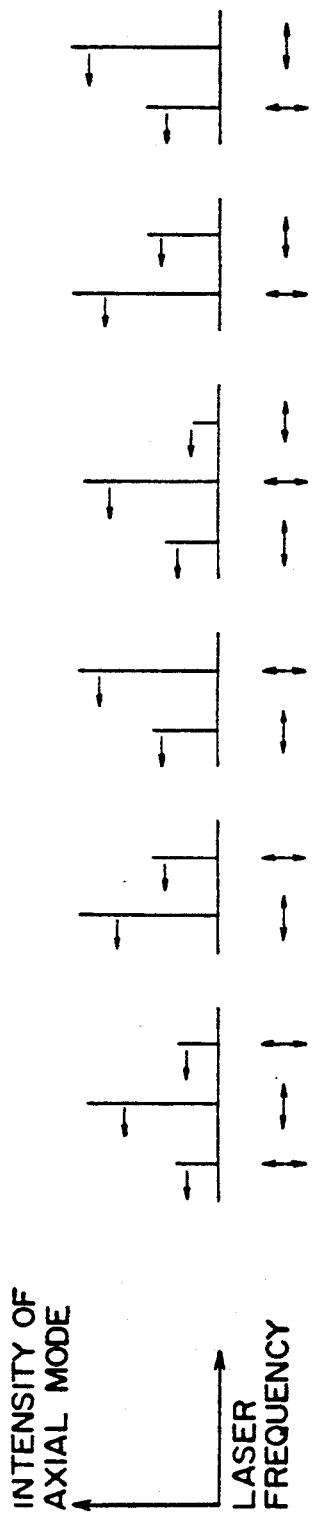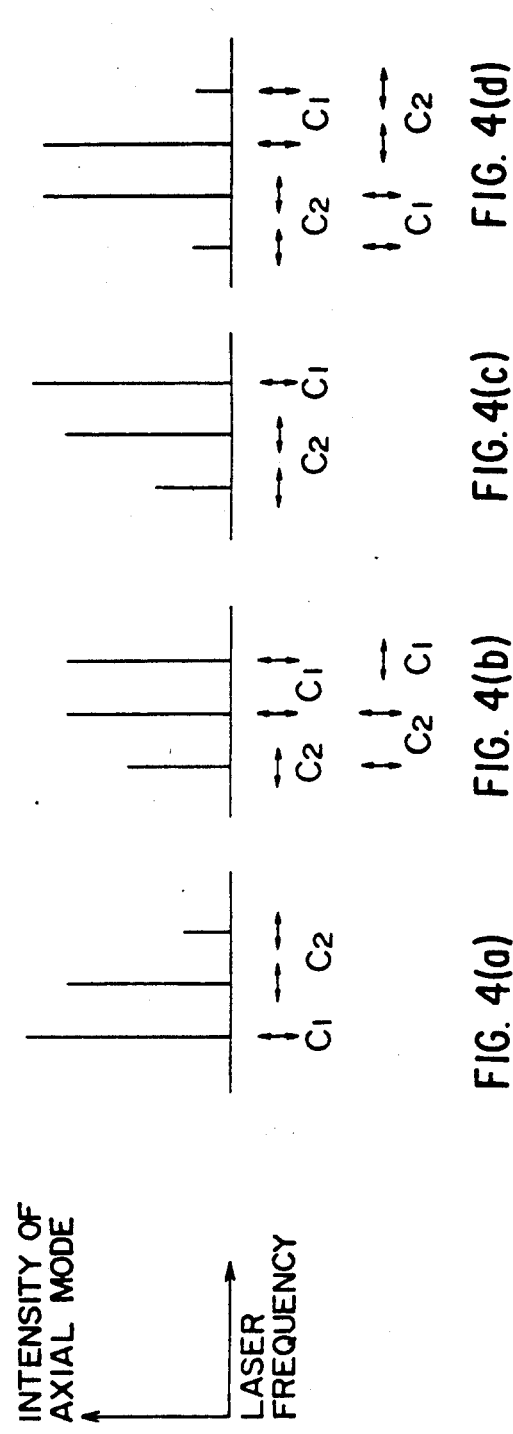

FIG. 5
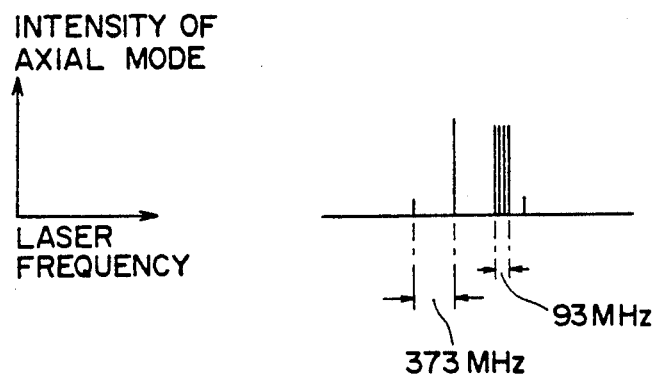
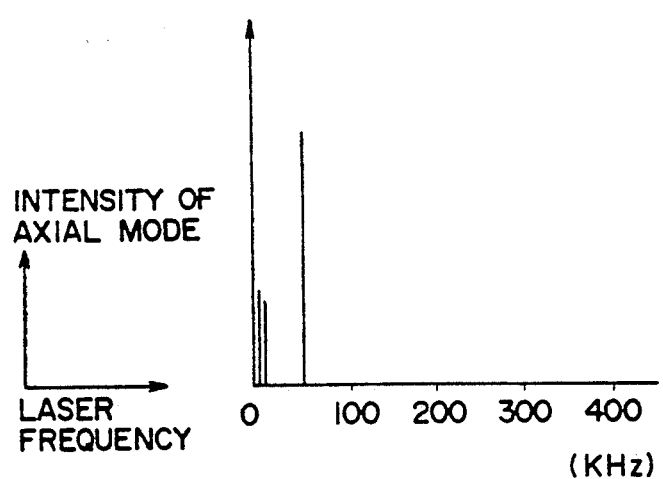
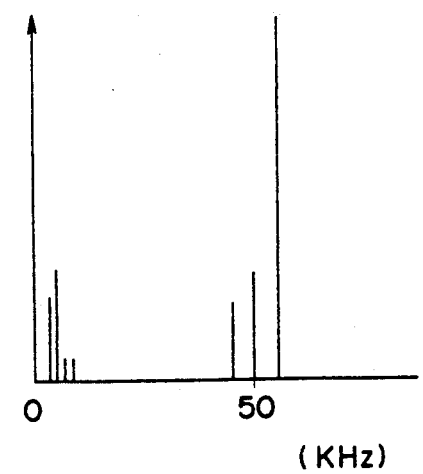
FIG. 6(a)     FIG. 6(b)

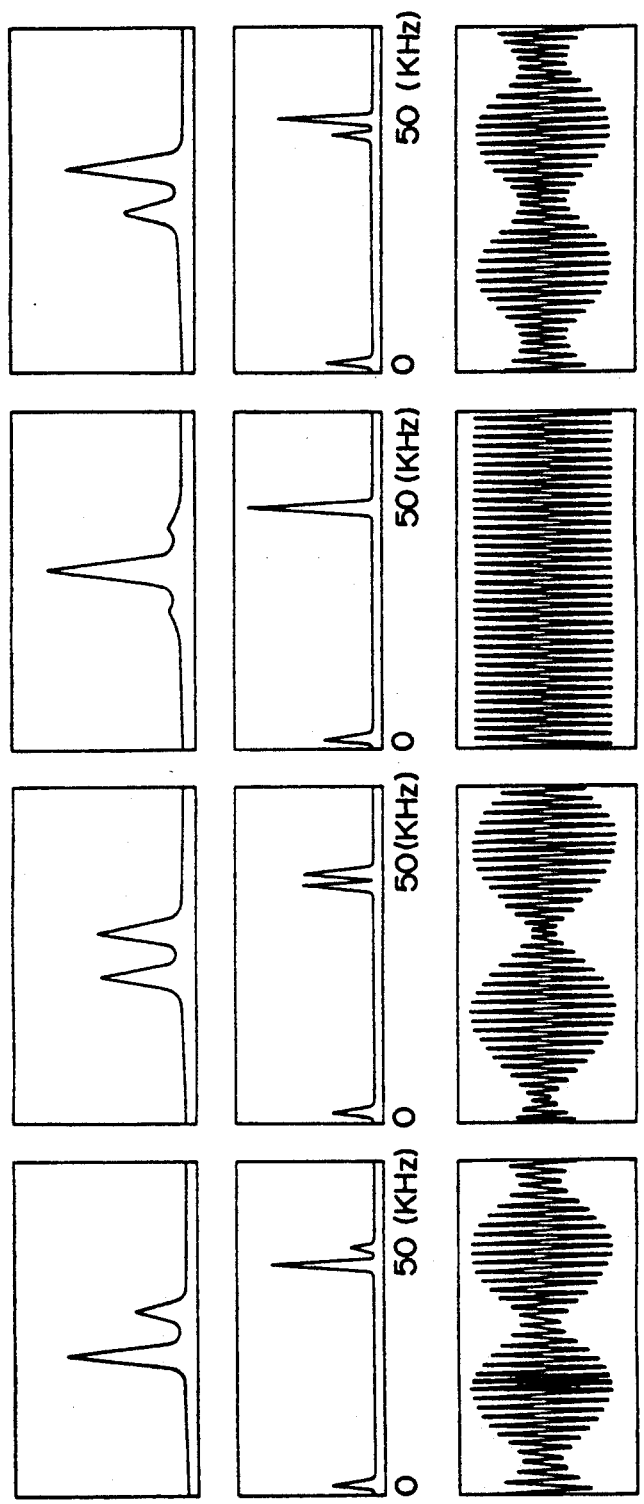

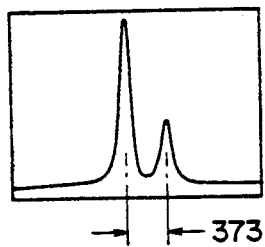
FIG. 10(a)
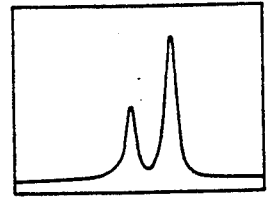
FIG. 10(b)
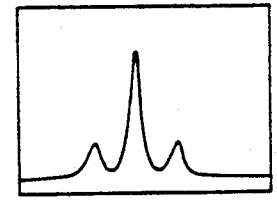
FIG. 10(c)
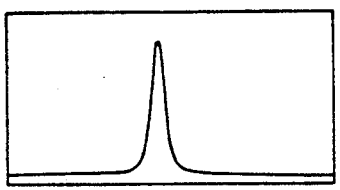
FIG. 11(a)
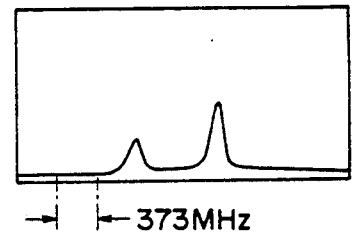
FIG. 11(b)
FIG. 13
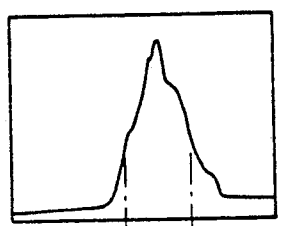

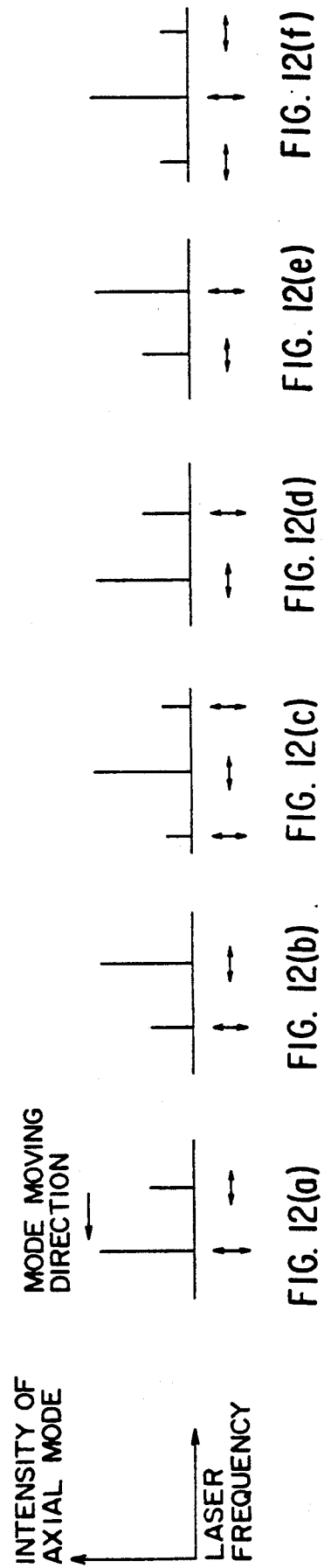

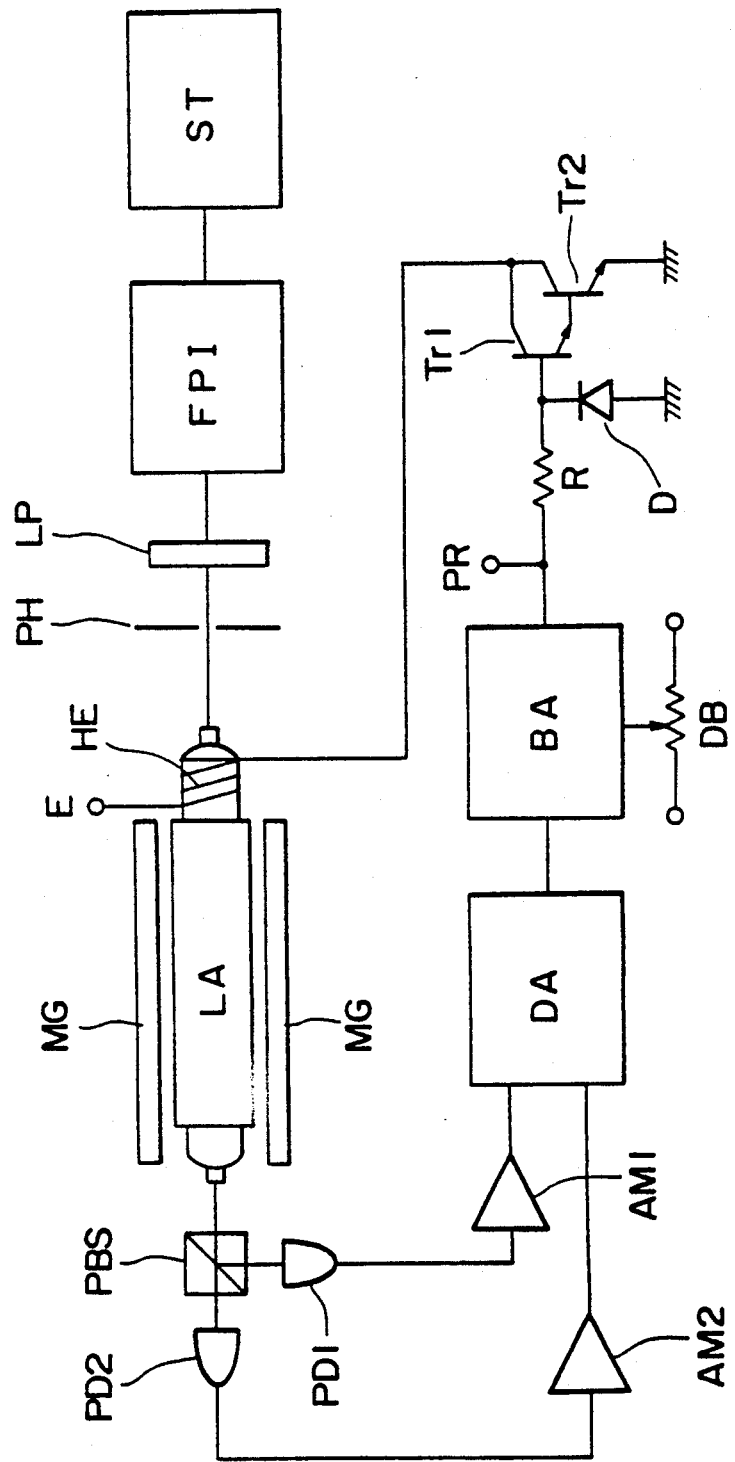
F I G. 16

F I G. 18
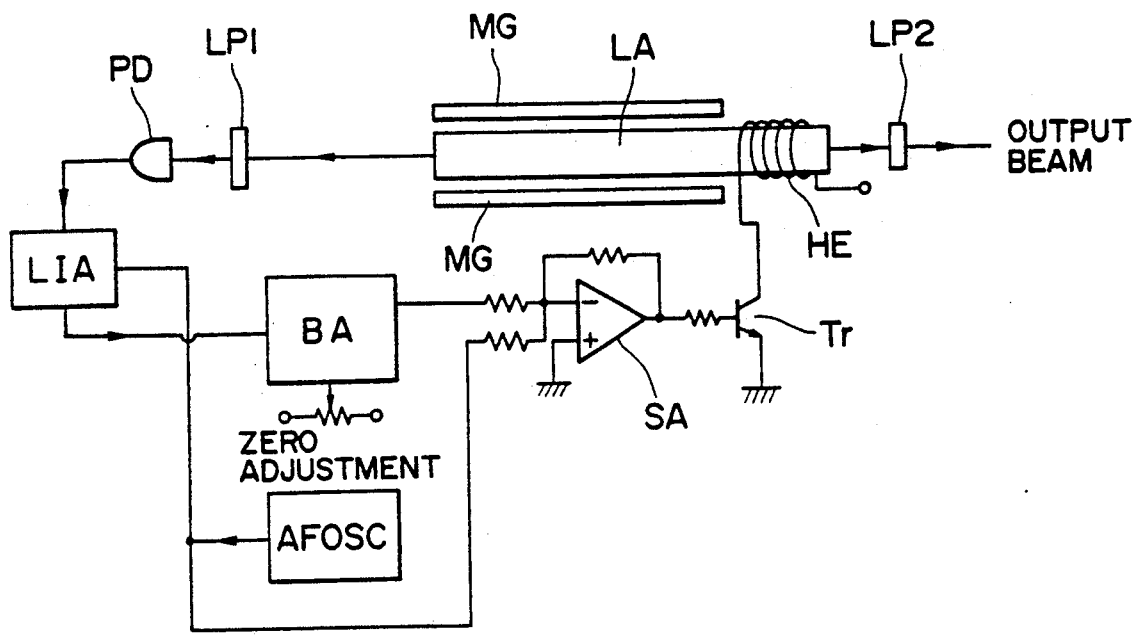
F I G. 19
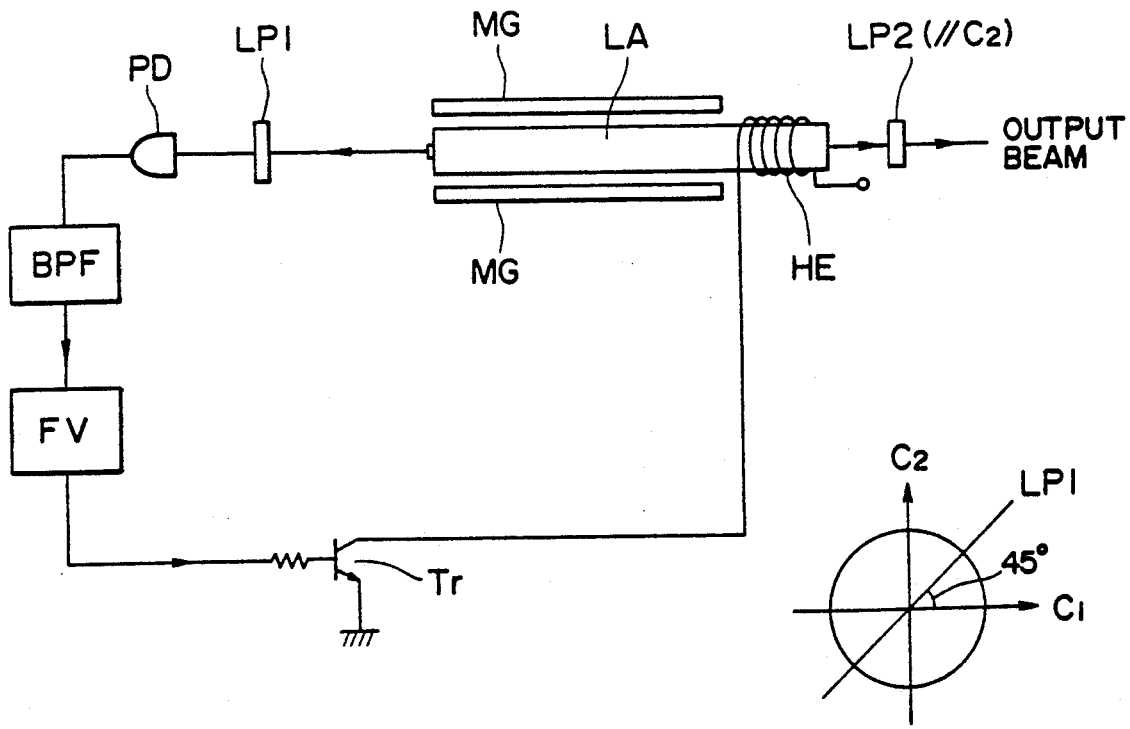

METHOD FOR THE FREQUENCY STABILIZATION OF INTERNAL MIRROR TYPE HELIUM-NEON LASER OSCILLATING AT WAVELENGTH OF 543 NM

BACKGROUND OF THE INVENTION

1. Field of the Invention

This invention relates to a method for the frequency stabilization of a laser oscillated from an internal mirror type helium-neon laser device, which has a structure with a laser capillary disposed in a laser tube, and having an oscillation wavelength of 543 nm.

2. Description of the Related Art:

As an oscillation wavelength of an internal mirror type helium-neon laser, a wavelength of 633 nm (red) has been known to date.

As means for stabilizing the oscillation frequency of the internal mirror type helium-neon laser having an oscillation wavelength of 633 nm (hereinafter called "633 nm He-Ne laser"), have already been established many controlling techniques, for example, two-mode method, Lamb dip method, iodine-absorption cell method, longitudinal Zeeman method, transverse Zeeman method, magnetic modulation method, etc.

On the contrary, an internal mirror type helium-neon laser having an oscillation wavelength of 543 nm (green) (hereinafter may called "543 nm He-Ne laser") is a relatively new laser the first oscillation of which was reported by Perry in 1970 [D. L. Perry, IEEE J. Quantum Electron, QE-7, 102 (1971)].

Since the oscillation wavelength of this 543 nm He-Ne laser is shorter than that of the 633 nm He-NE laser, it can be expected that its application to precision instrumentation will results in improved accuracy of the instrumentation. On the contrary, the 543 nm He-Ne laser however is extremely small as about 1/15–1/17 in gain of transition ($3s_2 \rightarrow 2p_{10}$) compared to the 633 nm He-NE laser. Its practical use has hence been difficult for a long time.

Recently, it has however been possible to enhance the oscillation output of the 543 nm He-Ne laser to the practical extent with a cavity length of 40 cm or so owing to the improved performance of the laser mirrors used therein.

In 1987, experimental results on frequency stabilization conducted by making use of a commercial 543 nm He-Ne laser were reported by T. Fellman et al. [Applied Optics, 126 (14), 2705 (1987)].

The existence of so-called polarization flipping, in which the polarization directions of axial modes polarizing orthogonally and linearly in the vicinity of the region where the axial modes become symmetrical configuration for the center of gain suddenly interchange by 90°, has been definitely shown by this report.

Accordingly, if the frequency stabilization of the 543 nm He-Ne laser is performed, for example, by using the two-mode method, it is necessary to avoid the region at which the above-mentioned polarization flipping occurs (hereinafter called "polarization flipping region").

The two-mode method mentioned above is a method making use of properties that polarizations in adjacent axial modes always become orthogonal and linear, and attempting the frequency stabilization of a laser by separating the polarizations in the adjacent axial modes by means such as a polarized beam splitter (PBS) or the like and then using their intensity difference or intensity ratio as an error signal for controlling the oscillation frequency of the laser.

The cavity lengths of laser devices commercially available at present are however adjusted to the extent of about 40 cm in order to enhance their output to practical levels. Therefore, the 543 nm He-Ne laser usually is found to oscillate in a range of 3-4 axial modes as illustrated in FIG. 1. Because a laser tube expands with heat and its cavity length is hence elongated when electrical input power is turned on to the laser tube, the axial modes change repeatedly like (a)→(b)→(c)→(d)→(a) ... in FIGS. 1(a)–1(d). In FIGS. 1(a)–1(d) $C_1$ and $C_2$ are characteristicc polarization directions of the laser tube. $C_1$ is the weak direction while $C_2$ is the strong direction, both, in light intensity.

However, the 543 nm He-Ne laser is greatly different from the 633 nm He-Ne laser, which has already been forward in putting it to practical use, in that:

(1) adjacent axial modes do not necessarily polarize orthogonally, but the group of parallel polarizations is always present; and (2) in the case of an axial mode configuration such that the gain competition between the modes becomes strong, namely, in the case of FIG. 1(b) or FIG. 1(d), the polarization flipping, wherein the polarization directions of each mode suddenly interchanges by 90°, occurs.

Accordingly, when the frequency stabilization of the 543 nm He-Ne laser is performed, for example, by using the two-mode method as is, there are encountered the following problems:

(1) the region capable of stabilizing frequency is limited; and (2) since the frequency stabilization can be effected only in the mode configuration and polarization state illustrated in FIG. 1(a) or FIG. 1(c), one polarized component comes to contain 2 frequency components in which their frequency difference is a axial mode spacing, whereby the laser becomes disadvantageous when it is used as a light source for a polarization interferowater.

SUMMARY OF THE INVENTION

The present invention has been completed with the above circumstances in view. An object of this invention is to provide a method which effectively avoids the polarization flipping of a 543 nm He-Ne laser, whereby the frequency stabilization of the laser can be achieved.

Another object of this invention is to a specific method capable of well stabilizing the frequency of the laser.

In one aspect of this invention, there is thus provided a method for the frequency stabilization of a laser oscillated from an internal mirror type helium-neon laser device, which has a structure with a laser capillary disposed in a laser tube, and having an oscillation wavelength of 543 nm, which comprises:

applying into the laser capillary a static magnetic field satisfying the following conditions (1)–(3):

(1) the direction of the static magnetic field is perpendicular to the axis of the capillary tube and the angle between the direction of the static magnetic field and the direction of a characteristic polarization of the laser tube is equal to 30°–42°;

(2) the magnitude of the static magnetic field is such that each Zeeman frequency in $\pi$ and $\pm\sigma$ transitions equals an axial mode spacing when the static magnetic field is applied into the laser capillary; and (3) the magnitude of the static magnetic field is almost even along the longitudinal direction of the laser capillary, so as to interchange the polarization directions of adjacent axial modes of the laser oscillating at the wavelength of 543 nm into orthogonal and linear polarizations, thereby preventing polarization flipping.

As described above, when the characteristic static magnetic field satisfying the above-mentioned conditions (1)–(3) is applied into the laser capillary, as understood from experimental results which will be described in detail subsequently, the polarization directions of axial modes fail to change suddenly by 90° even when the axial modes polarize orthogonally and linearly in the vicinity of the region where the axial modes become symmetrical configuration for the center of the gain profile.

It can be expected that the frequency of the 543 nm He-Ne laser is stabilized with the same performance as that in the 633 He-Ne laser by effectively avoiding the polarization flipping of the 543 nm He-Ne laser in the above-described manner.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIGS. 3(a)–3(f) diagrammatically illustrates an example of changes in axial modes when a static magnetic field has been applied into the laser capillary;

FIGS. 4(a)–4(d) diagrammatically illustrates axial modes observed by a Fabry-Perot interferometer in the condition that no static magnetic field is applied;

FIG. 5 diagrammatically shows a result obtained by following up the moving of the axial mode in the characteristic polarization direction $C_1$ from the occurrence of one polarization flipping up to the moment next polarization flipping occurs by means of a storage oscilloscope;

FIG. 6(a) diagrammatically shows observation results of beat in the mode configurations corresponding to FIGS. 4(a) and 4(c);

FIG. 6(b) diagrammatically shows observation results of beat in the mode configuration corresponding to FIG. 4(b);

FIGS. 9(a)–9(d) diagrammatically show axial mode configurations, beat spectra and beat waveforms, respectively, when set to $\theta = 0°$ in a characteristic transverse magnetic field;

FIGS. 10(a)–10(c) diagrammatically show axial mode configurations observed by setting to $\theta = 33°$ in a characteristic transverse magnetic field without use of a linear polarizer;

FIGS. 11(a) and FIG. 11(b) diagrammatically shows axial mode configurations when observed in the condition that a linear polarizer has been inserted so as to square the direction of the insertion with the characteristic polarization direction $C_1$;

FIGS. 12(a)–12(f) diagrammatically illustrates the moving of modes and the polarization states depending upon the thermal expansion of a resonator;

FIG. 13 diagrammatically shows a result obtained by recording a period for which the linear polarization of the characteristic polarization direction $C_1$ is oscillated as single axial mode on the storage oscilloscope;

FIG. 16 is an explanatory illustration showing schematically a laser device of a first embodiment for performing the frequency stabilization of a 543 nm laser in accordance with the present invention;

FIG. 18 is an explanatory illustration showing schematically a laser device of a second embodiment;

FIG. 19 is an explanatory illustration showing schematically a laser device of a third embodiment;

DESCRIPTION OF THE INVENTION AND PREFERRED EMBODIMENTS

The present inventors found a particular phenomenon while investigating polarization properties in a static magnetic field of a laser oscillated from an internal mirror type helium-neon laser device, which has a structure with a laser capillary disposed in a laser tube, and having an oscillation wavelength of 543 nm.

Namely, it was found that by applying a characteristic static magnetic field into the laser capillary, adjacent axial modes stably maintain their orthogonal and linear polarization state without polarization flipping even when the axial modes polarize orthogonally and linearly in the vicinity of the region where the axial modes become symmetrical configuration for the center of gain.

The static magnetic field at this time satisfied the following conditions (1)–(3):

(1) the direction of the static magnetic field is perpendicular to the axis of the capillary tube and the angle between the direction of the static magnetic field and the direction of a characteristic polarization of the laser tube is equal to 30°–42°;

(2) the magnitude of the static magnetic field is such that each Zeeman frequency in $\pi$ and $\pm \sigma$ transitions equals an axial mode spacing when the static magnetic field is applied into the laser capillary; and (3) the magnitude of the static magnetic field is almost even along the longitudinal direction of the laser capillary.

It was also found that in the state of the application of the above-described static magnetic field, only two axial modes are oscillated over a wide region of gain curve of the laser.

The present invention has been completed on the basis of such finding. Namely, this invention makes use of the feature that the characteristic static magnetic field is applied into a laser capillary of a 543 nm He-Ne laser, thereby keeping the polarization directions of adjacent axial modes in the 543 nm He-Ne laser orthogonal and linear to prevent their polarization flipping.

Figures 1A, 1B, 1C, 1D:
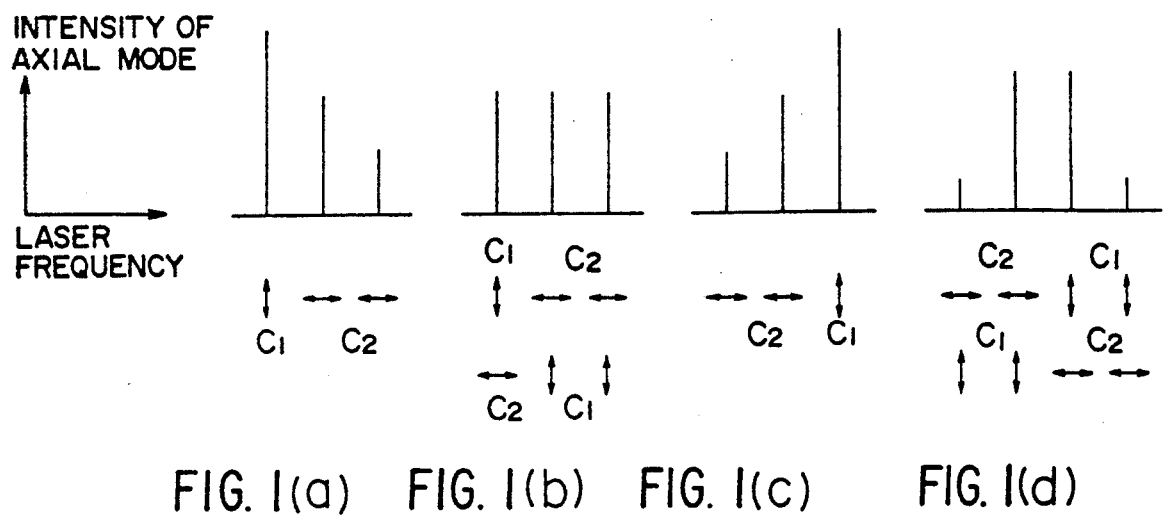
FIGS. 1(a)–1(d) diagrammatically illustrates axial modes of a conventional typical 543 nm He-Ne laser.
Figure 2A:
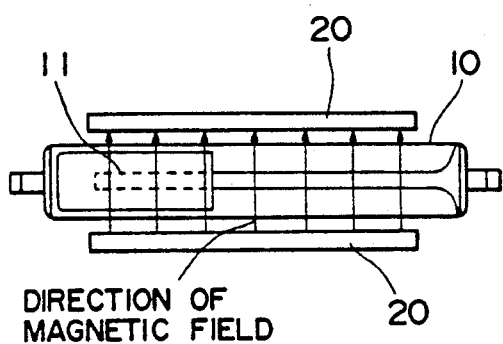
FIG. 2(a) is an explanatory illustration showing an example of means for applying a static magnetic field into a laser capillary.

FIG. 2(a) is an explanatory illustration showing an example of means for applying a static magnetic field. A magnet 20 is arranged in such a manner that it surrounds the outer periphery of a laser tube 10. By this magnet 20, a static magnetic field in a direction perependicular to the axis of a laser capillary 11, i.e., the light axis is applied into the laser capillary 11.

The magnitude of the static magnetic field is such that each Zeeman frequency in $\pi$ and $\pm\sigma$ transitions equals an axial mode spacing when the static magnetic field is applied into the laser capillary.

Figure 2B:
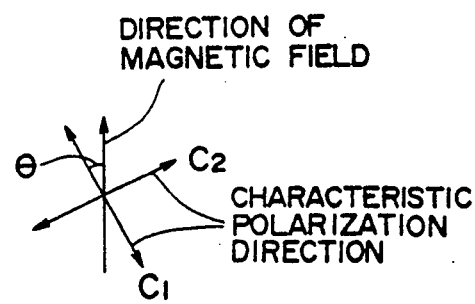
FIG. 2(b) is an illustration showing the direction of the static magnetic field applied.

The direction of the static magnetic field is perpendidular to the axis of the capillary tube 11 and is such that the angle $\theta$ between the direction of the static magnetic field and a characteristic polarization direction $C_1$ of the laser tube 10 is equal to around 30°-42° as illustrated in FIG. 2(b).

In the terms "characteristic polarization direction $C_1$" and "characteristic polarization direction $C_2$" as used herein, are defined the weak direction and the strong directiopn, both, in light intensity at each peak as "$C_1$" and "$C_2$", respectively, when monitoring their output through a linear polarizer.

The magnitude of the static magnetic field is almost even along the longitudinal direction of the laser capillary 11.

The magnet 20 for defining the static magnetic field may be either a permanent magnet made of, for example, ferrite or an electromagnet.

FIGS. 3(a)-3(f) diagrammatically illustrate an example of changes in axial modes when the static magnetic field has been applied under the conditions shown in FIGS. 2 (a) and 2(b). The axial modes change repeatedly as (a)→(b)→(c)→(d)→(e)→(f)→(a) . . . in FIGS. 3(a)-3(f). Namely, the polarization direction of each axial mode does not change while moving in such a way.

Therefore, if making use of the case where the axial modes became a mode configuration of FIG. 3(b), 3(c), or 3(f), the frequency stabilization by the two-mode method is permitted even in the 543 nm He-Ne laser in the same manner as in the 633 nm He-Ne laser.

As described above, according to this invention, the occurrence of the polarization flipping can be avoided. The present invention hence has the following advantages:

(1) The region capable of stabilizing frequency expands about 6 times compared to the method by T. Fellman et al.

(2) An automatic locking circuit can be fabricated with extreme ease. Incidentally, the term "automatic locking circuit" means a circuit by which the laser frequency is fixed automatically.

Experiments, which have been carried out to support the effectiveness of this invention, will hereinafter be described.

EXPERIMENT 1

Using a commercial internal mirror type 543 nm He-Ne laser device ("05-LGR-171", trade name; manufactured by Melles Griot) having a structure with a laser capillary disposed in a laser tube and a cavity length of 402 mm (axial mode spacing of 373 MHz), polarization properties of a laser was investigated in the condition that no static magnetic field is applied, i.e., in zero magnetic field.

In FIGS. 4(a)-4(d), are shown diagrammatically observation results of axial modes by a Fabry-Perot interferometer. Typical mode configurations and their polarization states are shown therein. Although the laser always oscillates with 3-4 axial modes and each mode polarizes linearly, adjacent longitudinal modes do not necessarily polarize orthogonally, but there are instances where they polarize parallelly unlike the 633 nm red He-Ne laser.

When electricity is turned on to the laser device to actuate it, a resonator expands with heat, whereby the axial modes move to the low-frequency side within a gain width. Its mode configuration hence changes repeatedly as (a)→(b)→(c)→(d)→(a) . . . in FIGS. 3(a)-3(d).

When the axial modes becomes a mode configuration that their intensity is close to a lateral symmetry like FIGS. 4(b) or 4(d), polarization flipping in which the polarization directions of the axial modes suddenly interchange by 90° occurs.

When respective experiments were conducted by using to commercial laser device of the same type as that described above, polarization flipping was indeed observed on both laser devices.

FIG. 5 diagrammatically shows a result obtained by placing a linear polarizer in front of the Fabry-Perot interferometer in such a manner that it is parallel to the characteristic polarization direction $C_1$ weak in light intensity at the peak and then following up the moving of the axial mode in the characteristic polarization direction $C_1$ from the occurrence of one polarization flipping up the moment next polarization flipping occurs by means of a storage oscilloscope. This corresponds to the change in the mode configuration of FIG. 4(c)→FIG. 4(d) and to the polarization flipping in FIG. 4(d). Two modes on the left in FIG. 5 are those generated by the occurrence of the polarization flipping. At this point of time, the storage into the storage oscilloscope was stopped. In this experiment, the stable region in polarization direction from one polarization flipping to next polarization flipping was found to be about 93 MHz.

The observation of beat caused by the union of axial modes was then attempted. A linear polarizer which is set to an angle of 45° with the characteristic polarization direction $C_1$ weak in light intensity at the peak and a wide-band amplifier sensitive at 0-20 MHz were used in the observation.

FIG. 6(a) diagrammatically shows observation results in the mode configurations corresponding to FIG. 4(a) and FIG. 4(c). As understood from FIG. 6(a), a beat was observed near 50 KHz. Incidentally, another beat was also observed momentarily near 100 KHz, but its intensity was an extent of one-tenth or lower compared to the beat at 50 KHz.

FIG. 6(b) diagrammatically shows observation result in the mode configuration corresponding to FIG. 4(b).

As apparent from FIG. 6(b), complicated changes in two or more spectra were seen near 50 KHz.

As described above, the 543 nm laser device oscillates with 3–4 axial modes and its characteristic polarization directions and beat also exhibit complicated changes depending upon cavity detuning. It was hence impossible to find properties expected to be usable in frequency stabilization.

Accordingly, in order to conduct the frequency stabilization in this laser device, it is necessary to avoid the polarization flipping. The region capable of stabilizing the frequency is so much narrow.

Two frequency components in which their frequency difference is an axial mode spacing, always come to be contained in the axial mode of one characteristic polarization direction, whereby the laser device is disadvantageous when it is used as a light source for a polarization interferometer.

EXPERIMENT 2

Using the same laser as in Experiment 1, an experiment was conducted to investigate polarization properties upon application of a static magnetic field in a direction perpendicular to the axis of a laser capillary, i.e., a transverse magnetic field into the laser capillary.

As means for frequency stabilization in Ne 633 nm transition, two-mode method, Lamb dip method, longitudial Zeeman method, transverse Zeeman method, etc. have already been put to practical use.

Particularly, the transverse Zeeman method is applicable to laser devices relatively long (about 26–28 cm) in their cavity length. The lasers stabilized by this method can also be used as a light source for optical heterodyne detection and have hence been known to be effective.

Accordingly, an experiment for studying polarization properties in the transverse magnetic field was carried out in order to confirm whether the transverse Zeeman method can also be applied to Ne 543 nm transition.

Figure 7:
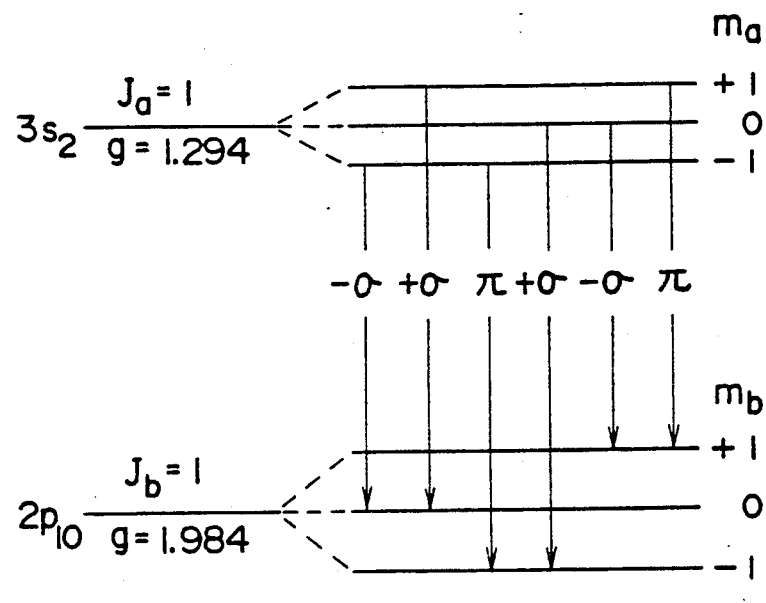
FIG. 7 is an explanatory illustration showing Ne 543 nm transitions in a transverse magnetic field.

FIG. 7 is an illustration diagrammatically showing the Ne 543 nm transition in a transverse magnetic field. Since $\Delta J$ equals 0, $\pi$ transition from $m_a=0$ to $m_b=0$ is forbiden. In the case of the 633 nm transition on the other hand, Landé's g factors of both low and high levels are $g_a=1.295$ and $g_b=1.301$, respectively, and are almost equal. Therefore, its Zeeman splitting frequency $F_z$ may be assumed to be represented by the following equation:

$$F_z = \mu_B g_a B / h \qquad (1)$$

wherein $\mu_B$ means a Bohr magneton and B denotes a magnetic flux density. In the case of the 543 nm transition on the contrary, $g_b$ equals 1.984 and is nonnegligibly different from $g_a$.

In the transverse Zeeman method, a magnetic field in which $F_z$ is equal to an axial mode spacing, i.e., a characteristic transverse magnetic field is applied to enhance the mode coupling between 3 axial modes (gain competition), thereby attaining the formation of single axial mode.

This has a direct relationship with the coupling between $\pi$ and $\sigma$ transitions, said coupling comprising a high or low level as a common level. In the 543 nm transition, $\pi$ and $\sigma$ transition holding a low level in common are two types of transition from $m_a=1, 0$ to $m_b=1$ and from $m_a=0, -1$ to $m_b=-1$. Their differences in frequency between $\sigma$ and $\pi$ transitions are given by the above-described equation (1).

On the other hand, $\pi$ and $\sigma$ transitions holding a high level in common are also two types of transitions from $m_a=1$ to $m_b=1, 0$ and from $m_a=-1$ to $m_b=0, -1$. The Zeeman splitting frequency $F'_z$ of their $\sigma$ and $\pi$ transitions are represented by the following equation:

$$F'_z = \mu_B g_b B / h \qquad (2)$$

Namely, the 543 nm transition has 2 values in the characteristic transverse magnetic field unlike the 633 nm transition. In this experiment, the former was chosen. In this case, the magnetic flux density giving the characteristic transverse magnetic field was 206 gausses.

Figure 8:
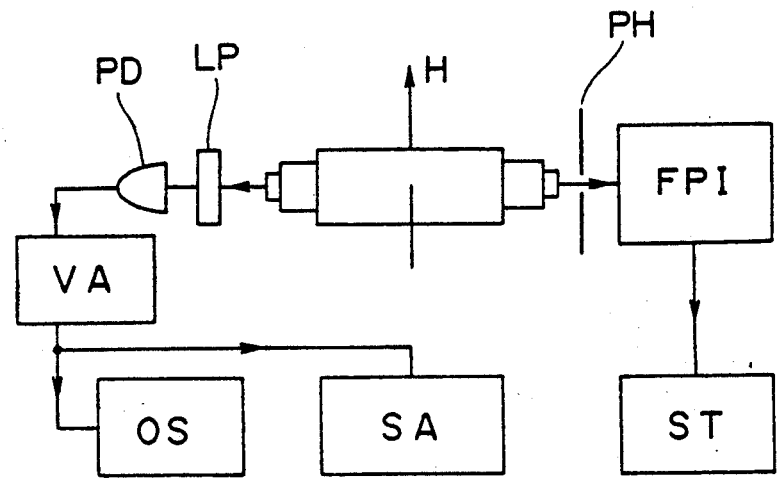
FIG. 8 is an explanatory illustration showing schematically an experimental device of a laser.

FIG. 8 is an explanatory illustration showing schematically an experimental device. A laser head is remodeled. Namely, both ends of the laser head are removed by cutting work so that the output-side (anode-side) end of a laser capillary can be visually observed and laser light is also derived from the high-reflection mirror side at the rear of a laser tube.

The transverse magnetic field H was formed by fixedly arranging ferrite magnets (30×40×10 mm; "FB4B"; product of TDK Corp.) on an iron plate of 6 mm thick at suitable intervals. An even transverse magnetic field (uniformity: ±4%) having a magnetic flux density of 202±8 gausses was applied into the laser capillary so as to strike on an about 78%-portion of its length (330 mm).

Incidentally, an angle between the direction of the transverse magnetic field H and the characteristic polarization direction $C_1$ weak in light intensity at the peak is defined as "$\theta$". In the case of the transverse Zeeman method, $\theta$ is 0° or 90°.

In FIG. 8, LP, PD, VA, OS, SA, PH, FPI and ST mean a linear polarizer, PIN photodiode, video amplifier, oscilloscope, spectrum analyzer, pinhole, Fabry-Perot interferometer and storage oscilloscope, respectively.

(1) Case of $\theta=0°$:

FIGS. 9(a)–9(d) diagrammatically show experimental results when set to $\theta=0°$.

Typical axial mode configurations, and beat spectra and beat waveforms in their corresponding mode positions are shown respectively in the upper, middle and lower rows in FIGS. 9(a)–9(d). By the way, the linear polarizer LP is set in such a manner that its angle with the characteristic polarization direction $C_1$ is 45°.

As understood from FIGS. 9(a)–9(d), when the transverse magnetic field is applied to the laser capillary, the number of axial modes decreases by 1 mode compared to the case of the zero magnetic field, and the laser hence oscillates with 2–3 modes.

On the other hand, the best spectra corresponding to the number of the axial modes appeared near 50 KHz. In the case of the 3-mode oscillation, the beat spectra however look like one spectrum, as it were, because the intensity of the axial modes on both sides in FIG. 9(c) is weak, whereby the beat spectrum corresponding to the axial mode of the center is predominant. When the linear polarizer LP was turned round to square its direction with the characteristic polarization direction $C_1$ or $C_2$, the beat spectra vanished.

When the axial modes were observed by means of the Fabry-Perot interferometer FPI through the linear polarizer LP set in such a manner that its angle with the characteristic polarization direction $C_1$ was 45°, amplitude modulation was found on each axial mode. When the liner polarizer LP was set parallel to the characteristic polarization direction $C_1$ or $C_2$, its modulation waveform vanished. In this case, however, axial modes themselve did not vanish.

From the above experimental results, each of these beat spectra can be considered to be a Zeeman beat within the same axial mode, which is caused by the $\sigma$ and $\pi$ transitions.

As understood from FIGS. 9(a)-9(d), the axial mode moved Within the gain width, changes in beat frequency were found to be several KHz or lower. By the way, the beat waveforms shown in the lower row of FIGS. 9(a)-9(d) can be explained as the synthesis of the beat spectra shown in the middle row.

As described above, when $\theta$ is 0°, the Zeeman beat within the same axial mode is observed, and the number of the axial modes is less by one than the case of the zero magnetic field. It could however not be attained to form single axial mode operation.

As its cause, it is considered that differences in coupling coefficient between the $\sigma$ and $\pi$ transitions by the difference in J number of the low level, in g value, in mirror quality (or in internal anisotropy), in cavity length, etc. compared with the 633 nm transition have close relationship with one another.

As illustrated in FIG. 9(c), in the case of 3-mode oscillation, the oscillation appears to have a tendency to concentrate on axial mode of the center. Accordingly, there is a possibility that the formation of signal axial mode can be realized by reducing the excitation intensity of the laser.

However, although the reduction of the excitation intensity of the laser permits the formation of the single axial mode, the laser output becomes very low, thereby involving a disadvantage upon its practical use. (2) Case of $\theta \neq 0°$:

In the characteristic transverse magnetic field, polarization properties at general angels in which the characteristic polarization direction $C_1$ was not parallel to the direction of the transverse magnetic field were then investigated.

As a result, the present inventors was found that when $\theta$ is within the range of about 36°±6°, the laser oscillates with 2-3 axial modes, the polarizations of adjacent axial modes are always orthogonal and linear, and no polarization flipping occurs while the axial modes move within the gain width. At this time, any Zeeman beat within the same axial mode was not observed even when the linear polarizer LP was set at any values of $\theta$.

FIGS. 10(a)-10(c) diagrammatically show observation results of axial modes, which have been obtained by setting to $\theta = 33°$ in the characteristic transverse magnetic field without using the linear polarizer LP. As understood from FIGS. 10(a)-10(c), the laser oscillates with 2-3 modes.

Mode observation was then conducted in the condition that the linear polarizer LP was inserted in front of the Fabry-Perot interferometer FPI so as to be parallel to the direction of the characteristic polarization direction $C_1$. As shown in FIG. 11(a) and FIG. 11(b), the adjacent modes vanished, but two axial mode appeared apart by two times the axial mode spacing.

At this time, when the linear polarizer LP was turned round by 90°, an axial mode, which had extingushed till then, appeared while the axial mode, which has appeared till then, was extinct. Accordingly, it could be confirmed that the adjacent modes polarize orthogonally and linearly along two characteristic polarization directions, respectively, and any Zeeman beat within the same axial mode does not occur.

FIGS. 12(a)-12(f) diagrammatically illustrates the moving of a series of axial modes and the polarization states depending upon the thermal expansion of a resonator. In FIGS. 12(a)-12(f) mode changes are repeated in an (a)→(b)→(c)→(d)→(e)→(f) cycle.

FIG. 13 diagrammatically shows a result obtained by recording a period for which $C_1$ component is oscillated as single axial mode on the storage oscilloscope. The region of the single mode was about 591 MHz.

Figure 14:
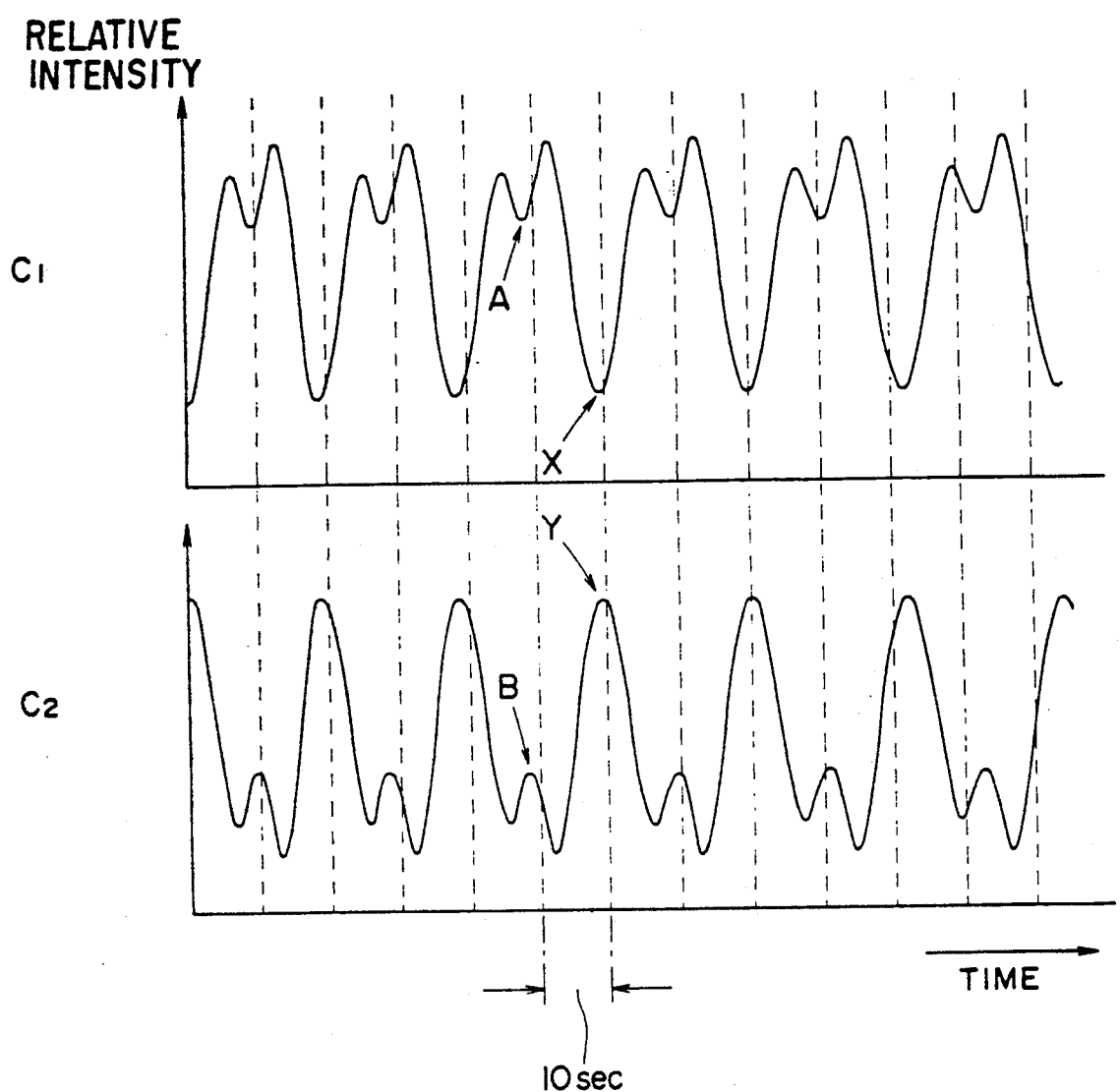
FIG. 14 diagrammatically illustrates results obtained by separating laser output by a polarized beam splitter into component light of both characteristic polarization directions $C_1$ and $C_2$ and then recording simultaneously changes of both component light with time.

FIG. 14 diagrammatically illustrates light intensities obtained by separation laser output by a polarized beam splitter into $C_1$ and $C_1$ components and recording simultaneously the changes of both components with time. At this time, the output from the high-reflector was detected to monitor simultaneously the moving of the axial modes.

It was confirmed from these results that both components in regions other than those corresponding to X and Y in FIG. 14 were single axial modes. It is therefore possible to stabilize the laser frequency by the two-mode method without polarization flipping even in the 543 nm transition like the case of the 633 nm transition when using a linear slop portion in FIG. 14.

In this case, there is a disadvantage of requiring a transverse magnetic field compared to the method of T. Fellman et al., while there are advantages that the region capable of stabilizing the frequency broadens and both components of the characteristic polarization directions oscillate with single axial modes, respectively, because the occurrence of the polarization flipping can be prevented.

The region shown by A in FIG. 14 is another region capable of using in the frequency stabilization. In the region A, the component of the characteristic polarization direction $C_2$ generates a dip in its output near almost center of its gain width and oscillates with single axial mode. Accordingly, it is possible to stabilize the oscillation frequency of the laser in the center of the dip by modulating the cavity length in the same manner as in the Lamb dip method, taking out only the component of the characteristic polarization direction $C_2$ by the polarized beam splitter PBS to subject the same to phase-sensitive detection, and then using the thus-detected component as an error signal.

Figure 15:
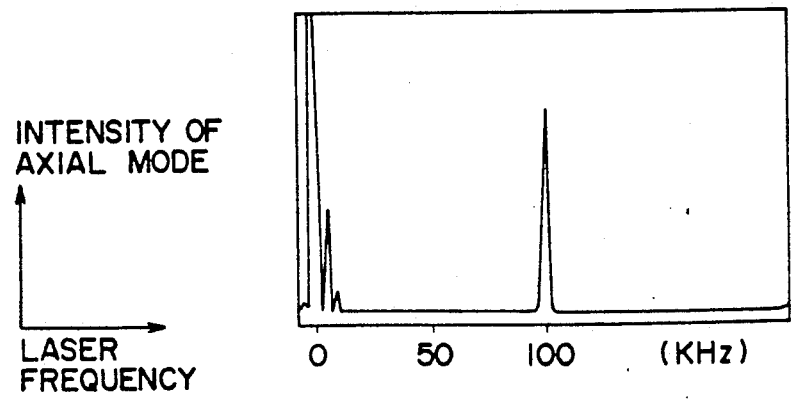
FIG. 15 diagrammatically shows a state that single beat spectrum is occurring.

The observation of beat was then conducted by setting the angle between the directions of linear polarizer LP and C1 at 45°, in the condition of $\theta = 33°$. As a result, when the axial mode configurations corresponded to the points A, B and X, Y in FIG. 14, single beat spectrum appeared near 100 MHz as shown in FIG. 15. The points A, B and X, Y correspond to the mode configurations of FIGS., 12(c) and 12(f) respectively. Namely, the single beat appeared while the axial modes kept three modes, and its change region was 90-100 MHz.

In view of the fact that the beat occurs only upon the 3-mode oscillation, the beat is considered to be a difference frequency spectrum between 2 mode spacings generated upon the 3-mode oscillation unlike the Zeeman beat of the case of $\theta = 0°$.

This beat properties are also effective from the viewpoint of the frequency stabilization. It is possible to stabilize the frequency, for example, by detecting this beat from the output from the high-reflection mirror, converting it to voltage signal by a frequency-voltage converter and then controlling the cavity length by a heater or the like depending upon the output obtained by the frequency-to-voltage converter.

In this case, it is possible to selectively take out only the center axial mode by arranging a linear polarizer LP or a polarized beam splitter PBS on the side of the output mirror. In this case, it is unnecessary to modulate the cavity length.

As has been described above in detail, according to this invention, it is possible, in a laser oscillated from an internal mirror type helium-neon laser device, which has a structure with a laser capillary disposed in a laser tube, and having an oscillation wavelength of 543 nm, to interchange the polarization directions of adjacent axial modes into orthogonal and linear polarizations and effectively preventing polarization flipping by applying a characteristic static magnetic field into the laser capillary, thereby conducting the frequency stabilization of the laser.

The present invention will hereinafter be described specifically by Examples to attain the frequency stabilization of the laser having an oscillation wavelength of 543 nm.

EXAMPLE 1

In this Example, the oscillation frequency of a 543 nm laser will be stabilized by the two-mode method. Namely, a static magnetic field satisfying the above-mentioned conditions (1)–(3) is applied into a laser capillary to interchange the polarization directions of adjacent axial modes thereof into orthogonal and linear polarizations. The intensity difference or intensity ratio of the adjacent modes is then detected so as to use the same as an error signal, thereby feedback-controlling a cavity length of the laser. The frequency of the 543 nm laser is thus stabilized.

In FIG. 16, LA, MG, PBS, PD1 AND PD2, AM1 and AM2, DA, BA, DB, PR, R, D, Tr1 and Tr2, HE, E, PH, LP, FPI, and ST mean an internal mirror type helium-neon laser tube, magnet, polarized beam splitter, PIN photodiodes, amplifiers (LF356), differential amplifier, buffer amplifier, d.c. bias voltage, connection terminal for a pen recorder, resistance, diode, transistors, heater for controlling the cavity length, power source for the heater, pinhole, linear polarizer, Fabry-Perot interferometer and storage oscilloscope, respectively.

The heater HE is formed from a nichrom wire (resistance: 20Ω) having a diameter of 0.26 mm and wound by bifilar winding over a width of 38 mm round an external glass tube at the front portion of the laser tube LA. One layer of a Teflon tape is wrapped thereon to fix the nichrom wire.

A 543 nm He-Ne laser light oscillated from the laser tube LA is separated by the polarized beam splitter PBS into component lights of both characteristic polarization directions $C_1$ and $C_2$. These components are detected and amplified by the PIN photodiodes PD1 and PD2, and the amplifiers AM1 and AM2, respectively.

Respective output from the amplifiers AM1 and AM2 are input into the differential amplifier DA. The difference (intensity difference) in their corresponding output between the two components is detected here.

The intensity difference is amplified by the differential amplifier DA. Based on the thus-amplified signal, the collector current of the transistor Tr 2 is controlled. Electric power supplied to the heater HE is hence controlled by the collector current thus controlled, whereby the cavity length of the laser tube LA is corrected. As a result, axial modes of the 543 nm He-Ne laser are stabilized so as to occupy a constant frequency position.

Figure 17:
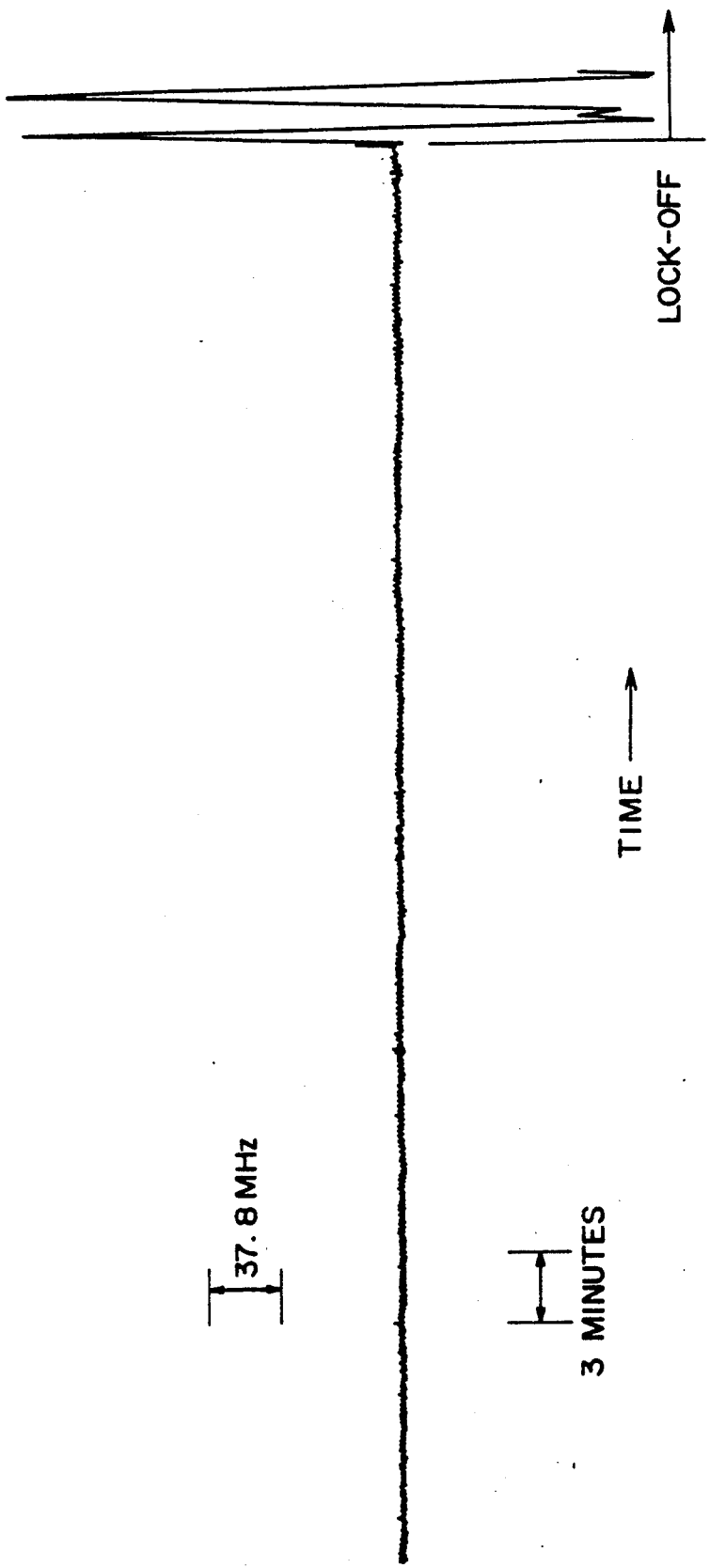
FIG. 17 diagrammatically illustrates a result of the frequency stabilization in the first laser device.
Figure 20:
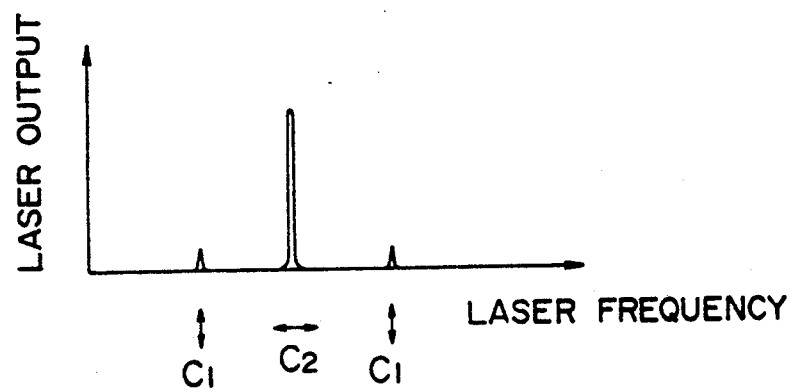
FIG. 20 is an explanatory illustration showing a mode configuration of laser output light prior to passing through a linear polarizer LP2 in the device of FIG. 19.

Using the laser device having the above-described constitution, a test was conducted to stabilize the frequency of a 543 nm laser in a room not air-conditioned and the output from the buffer amplifier BA was recorded on a pen recorder, thereby obtaining a result shown in FIG. 17. By the way, the conversion into the laser frequency change width on the axis of ordinates was conducted by simultaneously observing the output from the buffer amplifier BA and the moving of the axial modes within the gain width.

As understood from FIG. 17, the frequency stability of about $2.1 \times 10^{-8}$ (58 minutes) was obtained.

Although has described above about the case where the intensity difference between the two component lights was detected to use the same as an error signal, it may be preferable to apply a constitution that the intensity ratio of both component light may be detected to use it as an error signal. Specifically, for example, in the constitution of FIG. 16, the differential amplifier DA may be changed to a division circuit.

According to this Example, since the polarization flipping is effectively prevented by applying the characteristic magnetic field into the laser capillary of the internal mirror type 543 nm He-Ne laser device, and the intensity difference or intensity ratio of the adjacent axial modes is detected to use it as an error signal, thereby feedback-controlling the cavity length of the laser device, the frequency of the internal mirror type 543 nm laser can be stabilized in a wide region.

EXAMPLE 2

In this Example, a static magnetic field satisfying the above-mentioned conditions (1)–(3) is applied into a laser capillary to interchange the polarization directions of adjacent axial modes of a 543 nm laser into orthogonal and linear polarizations. In the conditions that the component light of the characteristic polarization direction strong in light intensity positions in the center and the component light of the characteristic polarization direction weak in light intensity position on both sides thereof so that the laser oscillates with 3 axial modes, the waveform of the dip formed in the center of the output waveform of the component light of the characteristic polarization direction strong in light intensity is detected phase-sensitively so as to use the same as an error signal, thereby feedback-controlling a cavity length of the laser. The frequency of the 543 nm laser is thus stabilized.

In FIG. 18, LA, MG, LP1 and LP2, PD, LIA, BA, AFOSC, SA, Tr, and HE mean an internal mirror type helium-neon laser tube, magnet, linear polarizers, photodiode, lock-in amplifier, buffer amplifier, audio-frequency oscillator, summing amplifier, transistor and heater for controlling the cavity length, respectively.

In the device of the constitution like this, power supply to the heater wound round the laser tube LA is first of all modulated by a signal from the audio-frequency oscillator AFOS to modulate the cavity length. Frequency components depending upon the modulation are phase-sensitively detected from the laser output light permeated through the linear polarizer LP1, which has been positioned in the direction squared with the characteristic polarization direction $C_2$, by means of the lock-in amplifier, thereby obtaining a differential signal as to the waveform of the dip in the region A shown in the upper row of FIG. 14. A linearly-slopping portion in the center of the differential signal is used as an error signal to control the cavity length by the heater HE, whereby the cavity length can be keep constant. The frequency stabilization of the laser can hence be attained. In this instance, by inserting the linear polarizer LP2 parallel to the characteristic polarization direction $C_2$ on the output side, a linear polarization of the direction squared with the characteristic polarization direction $C_2$ can be used as single axial mode.

EXAMPLE 3

In this Example, a static magnetic field satisfying the above-mentioned conditions (1)–(3) is applied into a laser capillary to interchange the polarization directions of adjacent axial modes of a 543 nm laser into orthogonal and linear polarizations. Beat output generated in the condition that the axial mode of the characteristic polarization direction strong in light intensity positions in the center and the axial modes of the characteristic polarization direction weak in light intensity position on both sides thereof, so that the laser oscillates with a total of 3 axial modes, is detected. The best output thus detected is subjected to frequency-to-voltage conversion. The thus-obtained signal is used to feedback-control the cavity length, thereby stabilizing the frequency of the 543 nm laser.

In FIG. 19, LA, MG, LP1 and LP2, PD, BPF, FV, Tr, and HE mean an internal mirror type helium-neon laser tube, magnet, linear polarizers, photodiode, band-pass filter, frequency-to-voltage converter, transistor and heater adapted to control the cavity length, respectively.

Figure 21:
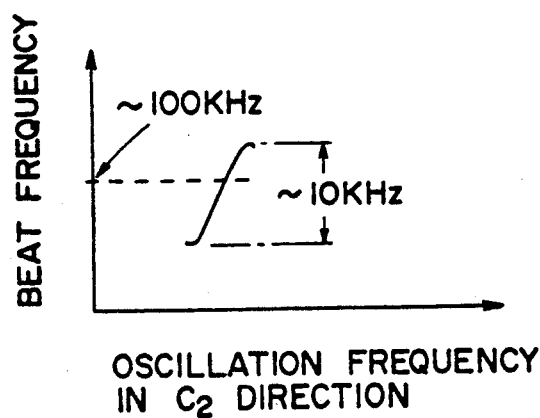
FIG. 21 is an explanatory illustration showing the frequency of beat detected through a linear polarizer LP1 in the device of FIG. 19.

The heater HE is wound round an external glass tube at the front portion of the laser tube LA. The linear polarizer LP1 disposed on the rear side of the laser tube LA is set in such a manner that its angel with the characteristic polarization direction $C_1$ or $C_2$ is 45° in order to detect the beat as illustrated in FIG. 21 from the leak light out of the rear mirror in the laser tube LP. On the other hand, the linear polarizer LP2 disposed on the front side of the laser tube LA is set parallel to the characteristic polarization direction $C_2$ in order to obtain output of single axial mode.

In the device of the constitution like this, light output from the rear mirror in the laser tube LA is detected through the linear polarizer LP1 by the photodiode PD. The thus-detected signal passes through the band-pass filter BPF and converted by the frequency-to-voltage converter into voltage change. Namely, the frequency change of the beat, as shown in FIG. 21, will be converted into voltage change. Accordingly, this voltage change is used as an error signal to control the electric power supplied to the heater HE, so that the cavity length is kept constant. The frequency of the laser is hence stabilized to a fixed value.

By the way, the oscillation in this instance becomes precise 3-mode oscillation. Therefore, when the laser output light are used through the linear polarizer LP2 disposed parallel to the characteristic polarization direction $C_2$, a laser of single axial mode can be obtained.

Having now fully described the invention, it will be apparent to one of ordinary skill in the art that many changes and modifications can be made thereto without departing from the spirit or scope of the invention as set forth herein.

What is claimed is:

1. A method for the frequency stabilization of a laser beam produced by an internal mirror type helium-neon laser device having a laser capillary disposed in a laser tube and an oscillation wavelength of 543 nm, said laser beam having a direction of a characteristic polarization, a Zeeman splitting frequency and spaced axial modes, said method comprising:
    applying into the laser capillary a static magnetic field so that:
    (1) the direction of the static magnetic field is perpendicular to the axis of the capillary tube and so that the angle between the direction of the static magnetic field and the direction of a characteristic polarization of the laser tube is equal to 30°–42°;
    (2) the magnitude of the static magnetic field is such that the Zeeman splitting frequency equals an axial mode spacing; and
    (3) the magnitude of the static magnetic field is substantially uniformly distributed along the axis of the laser capillary, so as to keep adjacent axial modes orthogonally polarized in a whole oscillation region, thereby preventing polarization flipping.

2. A method for the frequency stabilization of a laser beam produced by an internal mirror type heliumneon laser device having a laser capillary disposed in a laser tube and a cavity length to provide an oscillation wavelength of 543 nm, said laser beam having spaced axial modes each with a characteristic intensity and a direction of characteristic polarization, said method comprising:
    applying a static magnetic field to the laser capillary in a direction perpendicular to the axis of said capillary so as to interchange the polarization directions of adjacent axial modes in the laser beam into orthogonal and linear polarizations;
    detecting the intensity difference of the adjacent axial modes and using the detected intensity difference as an error signal for feedback-controlling the cavity length of the laser device.

3. An internal mirror type helium-neon laser device having a cavity length to provide an oscillation wavelength of 543 nm, and to produce a laser beam having spaced axial modes with characteristic directions of polarization, said laser device comprising:
    an internal mirror type helium-neon laser tube with a laser capillary disposed therein;
    a heater adapted to control the cavity length of the laser tube;
    a magnet arranged around the laser tube and adapted to apply a static magnetic field in such a manner that the polarization directions of adjacent axial modes of the laser beam are interchanged into orthogonal and linear polarizations;
    a polarized beam splitter adapted to separate that laser oscillated from the laser tube into respective component light of the characteristic polarization directions $C_1$ and $C_2$;
    a differential amplifier adapted to detect that intensity difference between the respective component light from the polarized beam splitter; and
    a control circuit for using the signal from the differential amplifier as an error signal so as to control the the heater, thereby feedback-controlling the cavity length.

4. An internal mirror type helium-neon laser device having a cavity length to provide an oscillation wavelength of 543 nm, and to produce a laser beam having spaced axial modes with characteristic directions of polarization, said laser device comprising:
- an internal mirror type helium-neon laser tube with a laser capillary disposed therein;
- a heater for controlling the cavity length of the laser tube;
- a magnet arrranged around the laser tube to apply a static magnetic field in a manner so that the polarization directions of adjacent axial modes of the laser beam are interchanged into orthogonal and linear polarizations;
- a polarized beam splitter to separate the laser oscillated form the laser tube into respective component light of the characteristic polarization directions $C_1$ and $C_2$;
- a division circuit to detect the intensity ratio of the respective component light from the polarized beam splitter; and
- a control circuity to use the signal from the direction circuit as an error signal for controlling the heater, thereby feedback-controlling the cavity length.

5. A method for the frequency stabilization of a laser beam produced by an internal mirror type helium-neon laser device having a laser capillary disposed in a laser tube and an oscillation wavelength of 543 nm, said laser beam having three axial modes with characteristic directions of polarization to develop a condition in which a central high intensity light component of the characteristic polarization direction is positioned between a pair of relatively low intensity light components of the characteristic polarization direction with a dip in the output waveform of the central light component, said method comprising:
- applying a static magnetic field to the laser capillary to interchange the polarization directions of adjacent axial modes in the laser beam into orthogonal and linear polarization; and
- detecting phase-sensitively the waveform of the dip formed in the center of the output waveform of the central light component to provide an error signal for feedback-controlling a cavity length of the laser.

6. An internal mirror type helium-neon laser device comprising:
- an internal mirror type helium-neon laser tube with a laser capillary disposed therein;
- an electrically powered heater to control the cavity length of the laser tube;
- a magnet arranged around the laser tube to apply a static magnetic field in a manner so that the polarization directions of adjacent axial modes of a laser beam having an oscillation wavelength of 543 nm are interchanged into orthogonal and linear polarizations $C_1$ and $C_2$, the polarization $C_2$ having a Lamb dip with a characteristic waveform;
- an audio-frequency oscillator adapted to modulate electric power supplied to the heater to modulate the cavity length;
- a lock-in amplifier adapted to phase-sensitively detect frequency components depending upon cavity length modulation from the laser output light permeated through a linear polarizer, which has been positioned in the direction squared with the characteristic polarization direction $C_2$, thereby obtaining a differential signal as to the waveform of the Lamp dip; and
- a summming amplifier for adding, as an error signal, a linearly-sloping portion in the center of the differential signal obtained from the lock-in amplifier and a modulation signal from the audio-frequency oscillator.

7. A method for the frequency stabilization of a laser beam produced by an internal mirror type helium-neon laser device having a laser capillary disposed in a laser tube and a cavity length to provide an oscillation wavelength of 543 nm, said laser beam having three axial modes with characteristic directions of polarization to develop a condition in which a central high intensity light component of the characteristic polarization direction is positioned between a pair of relatively low intensity light components of the characteristic polarization direction, said method comprising:
- applying a static magnetic field to the laser capillary so as to interchange the polarization directions of adjacent axial modes in the laser beam into orthogonal and linear polarizations; and
- detecting beat output generated under said condition in which a central high intensity light component of the characteristic polarization direction is positioned between a pair of relatively low intensity light components of the characteristic polarization direction;
- subjecting the beat output thus detected to frequency-to-voltage conversion to provide a voltage signal; and
- using the voltage signal to feedback-control the cavity length.

8. An internal mirror type helium-neon laser device having a cavity length to provide an oscillation wavelength of 543 nm and comprising:
- an internal mirror type helium-neon laser tube with a laser capillary disposed therein;
- a heater adapted to control the cavity length of the laser tube;
- a magnet arranged around the laser tube and adapted to apply a static magnetic field in such a manner that the polarization directions of adjacent axial modes of a laser beam produced by the device are interchanged into orthogonal and linear polarizations $C_1$ and $C_2$;
- a linear polarizer disposed in such a manner that its angle with the characteristic polarization direction $C_1$ or $C_2$ is 45° in order to detect beat from the leak light out of a mirror in the laser tube;
- a frequency-to-voltage converter adapted to convert the frequency change of the beat obtained from the linear polarizer into voltage change; and
- a control circuit to use the voltage change as an error signal so as to control the heater, so that the cavity length is controlled.

* * * * *